Patented Jan. 7, 1930

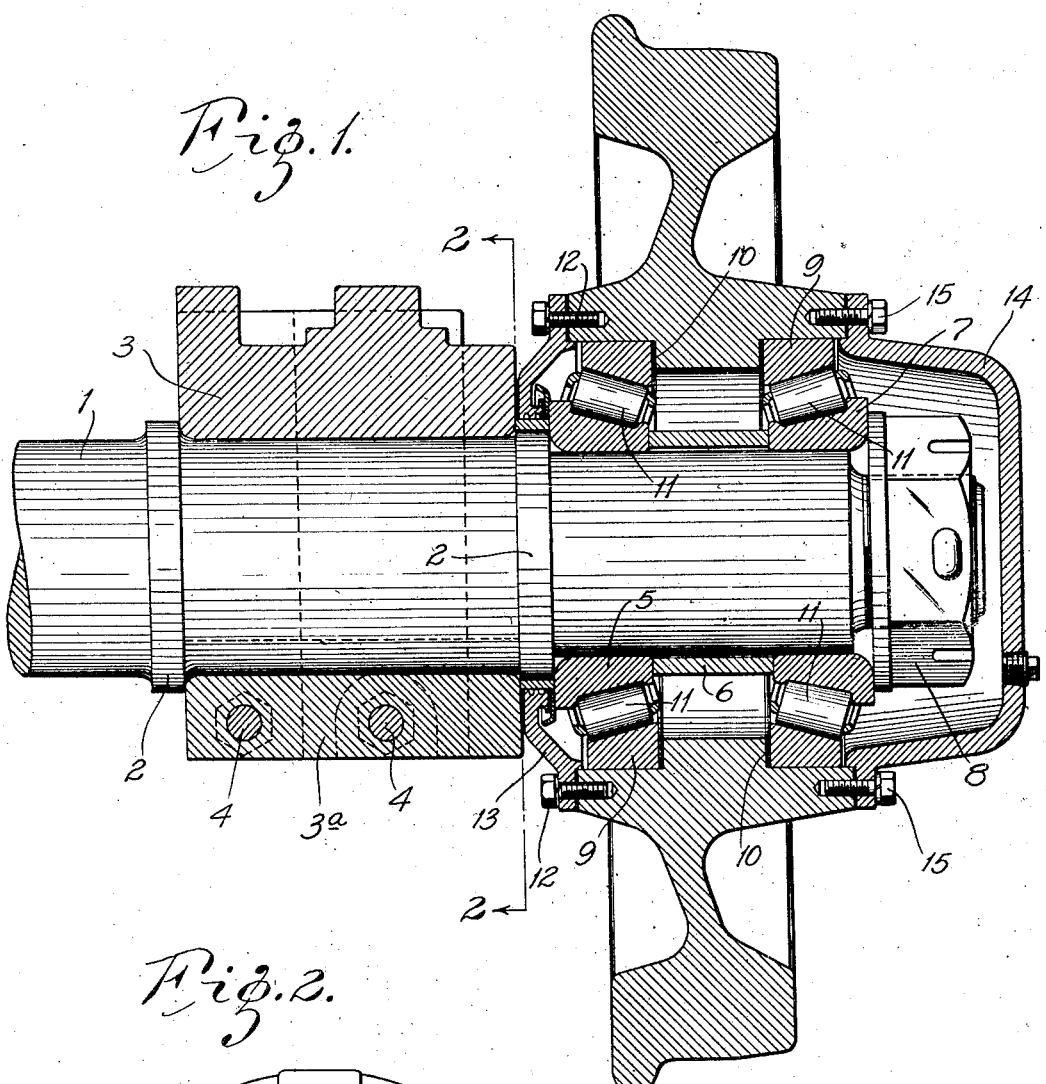
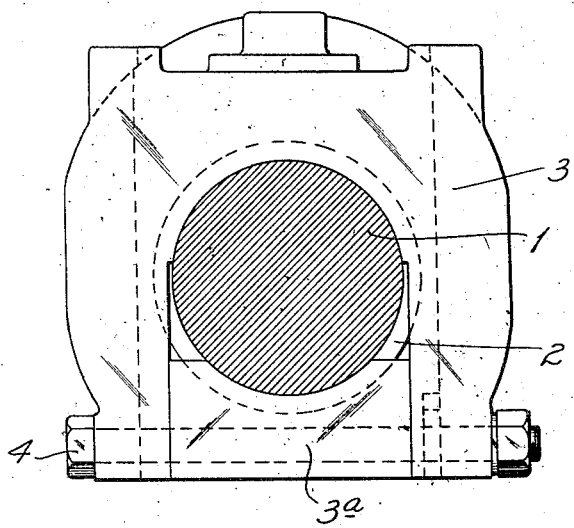

1,742,826

UNITED STATES PATENT OFFICE

WALTER C. SANDERS AND JOEL HEKTNER, OF CANTON, OHIO, ASSIGNORS TO THE TIMKEN ROLLER BEARING COMPANY, OF CANTON, OHIO, A CORPORATION OF OHIO

LOCOMOTIVE AXLE

Application filed April 18, 1928. Serial No. 271,030.

Our invention relates to locomotive axles and has for its principal object an axle that is interchangeable with present standard axles and which is provided with antifriction bearings. The invention consists principally in the locomotive axle and in the parts and combinations and arrangements of parts hereinafter described and claimed.

In the accompanying drawing, which forms part of this specification and wherein like numerals refer to like parts wherever they occur, Fig. 1 is an elevation of the end portion of a locomotive axle with the associated parts shown in vertical section lengthwise of the axle; and Fig. 2 is a vertical cross-section of the axle with the frame members shown in elevation.

According to the present practice, a portion of the locomotive axle near each end extends through a bearing box in which is mounted a bushing and a wheel is fixed to each end of the axle. According to the present invention antifriction bearings are interposed between each wheel and the end of the axle and the portions of the axle inwardly from the wheels extend through housings that are interchangeable with the present bearing boxes.

Near each end of an axle 1 are shoulders 2. A yoke or frame member 3 is mounted on the axle 1 between said shoulders 2. In the open end of said frame member is a block 3ª, said frame member and said block being secured together by bolts 4.

Abutting against the outermost shoulder 2 is the inner bearing member 5 of a taper roller bearing. A sleeve 6 of larger diameter than the axle at that point abuts against said cone 5 and against the outer end of said sleeve 6 is a second bearing cone 7 that is held on the axle by means of a nut 8. Bearing cups 9 are mounted in the hub of the wheel against shoulders 10. Rollers 11 are interposed between the respective cups and cones. Secured to the wheel as by cap screws 12 is a closure ring 13 that encircles the outer shoulder 2. A cap 14 closes the entire outer end of the wheel, said cap being secured by screws 15.

The axle may be tight in the frame members 3 or it may be capable of creeping movement therein. Such creeping movement is a safety device permitting the axle to turn in case of failure of the antifriction bearings and it also serves to distribute the wear and load on the bearing cups. The construction is interchangeable with present locomotive axles.

Obviously numerous changes may be made without departing from the invention and we do not wish to be limited to the precise construction shown.

What we claim is:

1. A locomotive axle construction comprising an axle having a reduced end portion, a hollow wheel on the end of said axle, taper roller bearings interposed between said axle and the wheel, a closure ring for the inner end of the wheel hub, a closure cap for the outer end of the wheel hub, and a frame member surrounding said axle between said shoulders, said frame member permitting creeping of the axle therein.

2. A locomotive axle construction comprising an axle having a reduced end portion, a hollow wheel on the end of said axle, taper roller bearings interposed between said axle and the wheel, a closure ring for the inner end of the wheel hub, a closure cap for the outer end of the wheel hub, said axle having spaced shoulders, one adjacent to the wheel, and a frame member surrounding said axle between said shoulders, said frame member permitting creeping of the axle therein.

3. A locomotive axle construction comprising an axle having a reduced end portion, a hollow wheel on the end of said axle, roller bearings interposed between said axle and the wheel, a closure ring for the inner end of the wheel hub, a closure cap for the outer end of the wheel hub, said axle having spaced shoulders, one adjacent to the wheel, and a frame member surrounding said axle between said shoulders in such manner as to permit creeping of said axle in said frame member, said frame member being interchangeable with standard locomotive bearing housings.

Signed at Canton, Ohio, this 3rd day of April, 1928.

WALTER C. SANDERS.
JOEL HEKTNER.